US009581692B2

(12) United States Patent
Lamkin et al.

(10) Patent No.: US 9,581,692 B2
(45) Date of Patent: Feb. 28, 2017

(54) COLLISION-AVOIDANCE SYSTEM FOR GROUND CREW USING SENSORS

(71) Applicant: Honeywell International Inc., Morristown, NJ (US)

(72) Inventors: Andrew Fannon Lamkin, Albuquerque, NM (US); Jeffrey W. Starr, Albuquerque, NM (US); Duke Buster, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 393 days.

(21) Appl. No.: 13/835,122

(22) Filed: Mar. 15, 2013

(65) Prior Publication Data

US 2014/0062756 A1 Mar. 6, 2014

Related U.S. Application Data

(60) Provisional application No. 61/706,632, filed on Sep. 27, 2012.

(51) Int. Cl.
*G01S 13/93* (2006.01)
*G08G 5/00* (2006.01)
(Continued)

(52) U.S. Cl.
CPC ............ *G01S 13/9303* (2013.01); *G01S 7/04* (2013.01); *G01S 13/931* (2013.01);
(Continued)

(58) Field of Classification Search
CPC ................. G01S 13/9303; G01S 13/93; G01S 2013/9335; G08G 5/0021
(Continued)

(56) References Cited

U.S. PATENT DOCUMENTS 5,381,338 A   1/1995   Wysocki et al.
5,448,243 A   9/1995   Bethke et al.
(Continued)

FOREIGN PATENT DOCUMENTS

EP   1787142 B1   11/2008
EP   2530486 A3   12/2012
(Continued)

OTHER PUBLICATIONS

Office Action from U.S. Appl. No. 13/689,495, dated Apr. 3, 2015, 10 pp.
(Continued)

*Primary Examiner* — Marcus Windrich
(74) *Attorney, Agent, or Firm* — Shumaker & Sieffert, P.A.

(57) ABSTRACT

A ground obstacle collision-avoidance system includes a plurality of radar sensor modules that each receive at a radar detector radar return signals corresponding to reflections of the emitted signal from a ground obstacle, and transmits radar information associated with the received radar signal reflections reflected from the ground obstacle, wherein each of the plurality of radar sensor modules are uniquely located on a surface of an aircraft that is at risk for collision with a ground obstacle if the aircraft is moving; a gateway unit that receives the radar information transmitted from the radar sensor module and transmits information associated with the received radar information; a processing system configured to determine a distance from the installation aircraft to a detected ground object detected; and a display configured to present a plan view indicating an aircraft icon and a graphical ground obstacle icon that is associated with the detected ground obstacle.

20 Claims, 5 Drawing Sheets

(51) Int. Cl.
*G08G 5/06* (2006.01)
*G01S 7/04* (2006.01)
*G01S 7/22* (2006.01)

(52) U.S. Cl.
CPC ........... *G08G 5/0021* (2013.01); *G08G 5/065* (2013.01); *G01S 7/22* (2013.01); *G01S 2013/9335* (2013.01)

(58) Field of Classification Search
USPC .................................................. 342/29–32
See application file for complete search history.

(56) References Cited

U.S. PATENT DOCUMENTS

| | | | |
|---|---|---|---|
| 5,983,161 A | 11/1999 | Lemelson et al. | |
| 6,118,401 A * | 9/2000 | Tognazzini | G01S 7/04 342/29 |
| 6,246,320 B1 | 6/2001 | Monroe | |
| 6,895,332 B2 * | 5/2005 | King | G08G 1/0965 340/902 |
| 7,379,165 B2 | 5/2008 | Anderson et al. | |
| 7,463,183 B2 | 12/2008 | Reich | |
| 7,561,037 B1 | 7/2009 | Monroe | |
| 7,579,980 B2 | 8/2009 | Anderson et al. | |
| 7,839,322 B2 | 11/2010 | Filias et al. | |
| 7,903,023 B2 | 3/2011 | Cornic et al. | |
| 7,932,838 B2 | 4/2011 | Hamza et al. | |
| 7,986,249 B2 | 7/2011 | Wilson et al. | |
| 8,019,529 B1 | 9/2011 | Sharma et al. | |
| 8,121,786 B2 | 2/2012 | Morbey et al. | |
| 8,249,762 B1 | 8/2012 | Flotte et al. | |
| 8,271,186 B2 | 9/2012 | Nouvel et al. | |
| 8,378,852 B2 | 2/2013 | Naimer et al. | |
| 8,629,800 B2 * | 1/2014 | Anderson | B60Q 1/48 342/109 |
| 8,754,786 B2 | 6/2014 | Burns et al. | |
| 8,917,191 B1 | 12/2014 | Tiana et al. | |
| 8,976,042 B1 | 3/2015 | Chiew et al. | |
| 2001/0037166 A1 | 11/2001 | Block | |
| 2002/0109625 A1 | 8/2002 | Gouvary | |
| 2003/0067542 A1 | 4/2003 | Monroe | |
| 2004/0225420 A1 | 11/2004 | Morizet et al. | |
| 2005/0007257 A1 | 1/2005 | Rast | |
| 2006/0066459 A1 | 3/2006 | Burch et al. | |
| 2006/0066470 A1 | 3/2006 | Anderson et al. | |
| 2006/0119472 A1 | 6/2006 | Tsuboi | |
| 2007/0002138 A1 | 1/2007 | Oldroyd | |
| 2008/0062011 A1 * | 3/2008 | Butler | G01S 3/783 340/961 |
| 2008/0103641 A1 | 5/2008 | Ratcliffe | |
| 2008/0172178 A1 | 7/2008 | Anderson et al. | |
| 2008/0180310 A1 | 7/2008 | Reich | |
| 2008/0198041 A1 * | 8/2008 | Sallier | G01C 23/005 340/978 |
| 2008/0306691 A1 * | 12/2008 | Louis | G08G 5/06 701/301 |
| 2009/0033552 A1 * | 2/2009 | Kirmuss | G01C 21/20 342/357.75 |
| 2009/0164122 A1 * | 6/2009 | Morbey | G08G 5/0021 701/301 |
| 2009/0174591 A1 * | 7/2009 | Cornic | G01S 13/44 342/29 |
| 2009/0295622 A1 | 12/2009 | Anderson et al. | |
| 2009/0323046 A1 * | 12/2009 | Tan | E01H 1/00 356/4.01 |
| 2010/0060511 A1 | 3/2010 | Nouvel et al. | |
| 2010/0123599 A1 * | 5/2010 | Hamza | G08G 5/06 340/903 |
| 2010/0219988 A1 * | 9/2010 | Griffith | G01S 13/931 340/961 |
| 2011/0015816 A1 | 1/2011 | Dow et al. | |
| 2011/0187563 A1 | 8/2011 | Sanders-Reed | |
| 2011/0216059 A1 | 9/2011 | Espiritu et al. | |
| 2011/0224845 A1 | 9/2011 | Perry et al. | |
| 2012/0092208 A1 * | 4/2012 | LeMire | G01S 13/87 342/29 |
| 2012/0130624 A1 | 5/2012 | Clark et al. | |
| 2012/0200433 A1 | 8/2012 | Glover et al. | |
| 2013/0002454 A1 | 1/2013 | Burns et al. | |
| 2013/0096814 A1 | 4/2013 | Louis et al. | |
| 2013/0120164 A1 | 5/2013 | Greene et al. | |
| 2013/0127642 A1 | 5/2013 | Maggiore et al. | |
| 2013/0321169 A1 | 12/2013 | Bateman et al. | |
| 2013/0321176 A1 | 12/2013 | Vasek et al. | |
| 2013/0321192 A1 | 12/2013 | Starr et al. | |
| 2013/0325245 A1 | 12/2013 | Kolcarek et al. | |
| 2013/0345906 A1 | 12/2013 | Kabrt et al. | |
| 2014/0062756 A1 | 3/2014 | Lamkin et al. | |

FOREIGN PATENT DOCUMENTS

| | | |
|---|---|---|
| EP | 2530486 A3 | 1/2013 |
| FR | 2932279 A1 | 12/2009 |
| JP | 2011028579 A | 2/2011 |
| WO | 2006027762 A1 | 3/2006 |
| WO | 2013181334 A1 | 12/2013 |

OTHER PUBLICATIONS

Dubois, "Eurocopter Researches Low-Cost Obstacle Warning," Aviation International News, retrieved from internet http://www.ainonline.com/aviation-news/aviation-international-news/2012-05-02/eurocopter-researches-low-cost-obstacle-warning, May 2, 2012, 3 pp.
Yamawaki et al., "60-GHz Millimeter-Wave Automotive Radar," Fujitsu Ten Tech., No. 11, 1998, 12 pp.
Notice of Allowance dated Aug. 15, 2014 from U.S. Appl. No. 13/689,495, 10 pp.
International Preliminary Report on Patentability from counterpart International Patent Application No. PCT/US2013/043257, dated Dec. 11, 2014, 8 pp.
Notice of Allowance from U.S. Appl. No. 13/689,495, dated Dec. 24, 2014, 8 pp.
Search Report and Written Opinion from counterpart International Application No. PCT/US2013/043257, dated Aug. 27, 2013. 11 pp.
Abstract of "Pilots view airport charts," Engineering Village, May 2005, retrieved from www.engineeringvillage.com on Jun. 21, 2013, 1 pp.
Kamineni et al., "Electronic Moving Map of Airport Surface on Electronic Flight Bag," IEEE, Digital Avionics Systems Conference, Oct. 24-28, 2004, vol. 1, 9 pp.
U.S. Appl. No. 14/149,482, by Jeffrey W. Starr et al., filed Jan. 7, 2014.
Response to Office Action mailed Apr. 3, 2015, from U.S. Appl. No. 13/689,495, filed Jul. 1, 2015, 12 pp.
Notice of Allowance from U.S. Appl. No. 13/689,495, mailed Jul. 28, 2015, 7 pp.
Prinzel et al., "Synthetic Vision Systems," retrieved from http://ntrs.nasa.gov/archive/nasa/casi.ntrs.nasa.gov/20090007635.pdf, Jan. 1, 2009, 14 pp.
Extended Search Report from counterpart European Application No. 13796900.2, dated Nov. 12, 2015, 8 pp.
Response to European Office Action dated Dec. 1, 2015, from counterpart European application No. 13796900.2-1812, filed Feb. 25, 2016, 16 pp.

* cited by examiner

US 9,581,692 B2

COLLISION-AVOIDANCE SYSTEM FOR GROUND CREW USING SENSORS

PRIORITY CLAIM

This application claims the benefit of U.S. Provisional Application Ser. No. 61/706,632, filed Sep. 27, 2012, the content of which is hereby incorporated by reference in its entirety. The entire content of U.S. Provisional Application Ser. No. 61/653,297, filed May 30, 2012, is also incorporated by reference herein.

BACKGROUND OF THE INVENTION

Aircraft flight crew members or ground crew members maneuvering an aircraft on the ground may have difficulty in being aware of potential collisions of portions of the aircraft with other objects as the aircraft is moving. The difficulty arises, in part due to limited visibility caused by the relatively large size of the aircraft and or the tow tug, and due to potential distractions, such as other moving vehicles, or such as other taxi way maneuvers and related operations being performed by the aircraft crew.

If a land-based ground obstacle is in the way of the towed aircraft, the wing tips or tail of the towed aircraft may inadvertently collide with the ground obstacle. Examples of ground obstacles include, but are not limited to, a hangar or other building, a lighting pole, a vehicle, another aircraft, or a fence. Accordingly, there is a need in the arts to reduce the number and/or severity of inadvertent collisions of the towed aircraft with ground obstacles.

SUMMARY OF THE INVENTION

The present invention provides a ground obstacle collision-avoidance system for members of an aircraft's flight crew and/or a ground crew. An example embodiment includes a plurality of radar sensor modules that each receive at a radar detector radar return signals corresponding to reflections of the emitted signal from a ground obstacle, and transmits radar information associated with the received radar signal reflections reflected from the ground obstacle, wherein each of the plurality of radar sensor modules are uniquely located on a surface of an aircraft that is at risk for collision with a ground obstacle if the aircraft is moving; a gateway unit that receives the radar information transmitted from the radar sensor module and transmits information associated with the received radar information; a processing system configured to determine a distance from the installation aircraft to a detected ground object detected; and a display configured to present a plan view indicating an aircraft icon and a graphical ground obstacle icon that is associated with the detected ground obstacle. The presented graphical ground obstacle icons indicate locations of ground obstacles that are in proximity to the aircraft so that the aircraft may be operated so as to avoid collision between the aircraft and the ground obstacle.

BRIEF DESCRIPTION OF THE DRAWINGS

Preferred and alternative embodiments of the present invention are described in detail below, with reference to the following drawings.

DETAILED DESCRIPTION OF THE INVENTION

Figure 1:
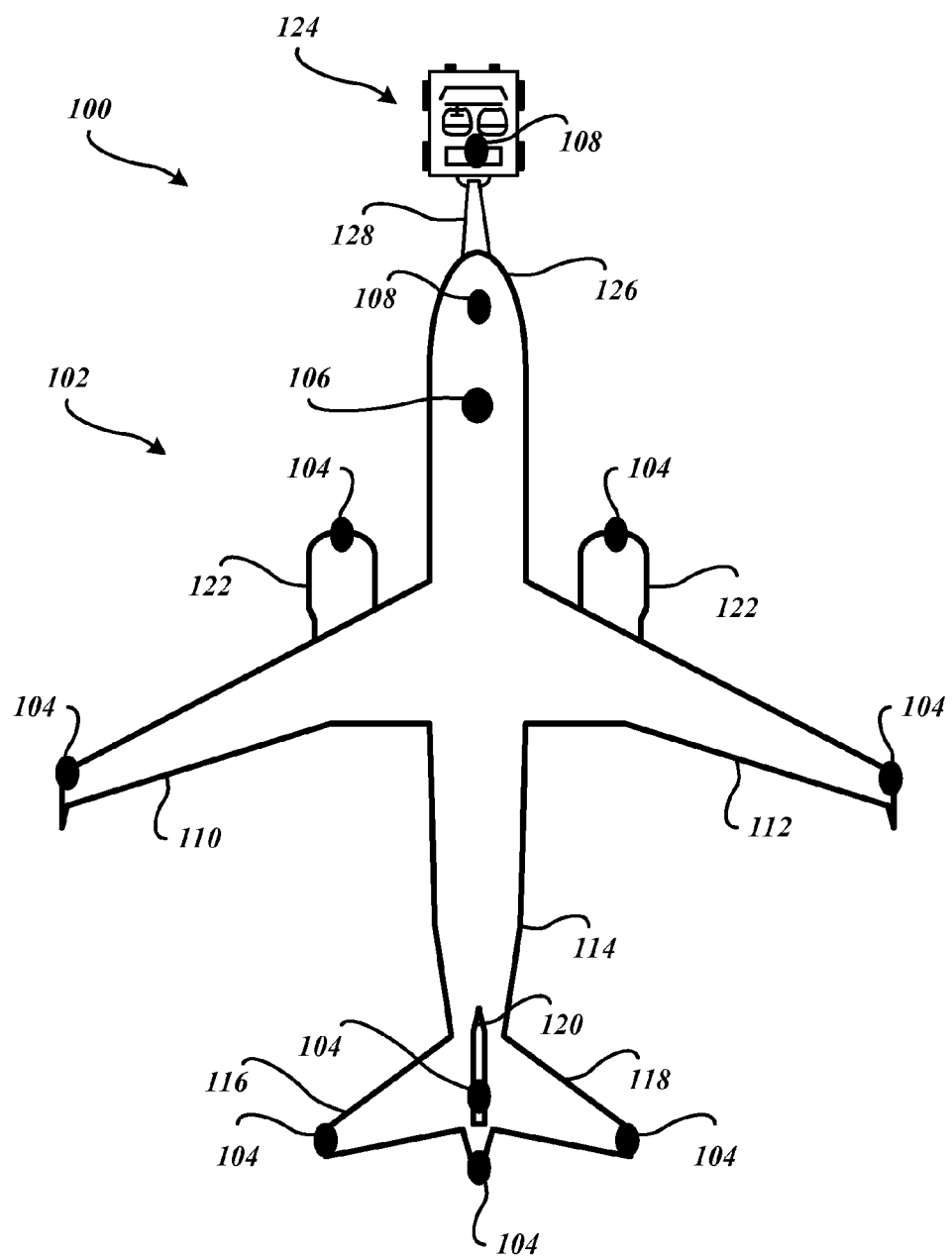
FIG. 1 is a view of an exemplary ground obstacle collision-avoidance system embodied in an aircraft.

FIG. 1 is a view of an embodiment of an exemplary ground obstacle collision-avoidance system 100 embodied in an installation aircraft 102 (interchangeably referred to as the aircraft 102). The ground obstacle collision-avoidance system 100 includes radar sensor modules 104 (e.g., a radar emitter/detector device) located on the exterior of the aircraft 102 at selected locations that may be at risk for collision with a ground obstacle while the aircraft 102 is being moved under the control of the aircraft crew and/or being towed by a ground crew.

The radar sensor modules 104 emit radar signals. If a radar signal return from a ground obstacle is detected by one or more of the radar sensor modules 104, a determination is made of the location of the detected ground obstacle. During movement of the aircraft 102 while under the control of the aircraft crew and/or during the towing of the aircraft 102 by the ground crew, a presented plan view will indicate the existence and the relative location of detected ground obstacles.

In an example embodiment, radar information is sent to a gateway unit 106 which performs the processing of the detected radar return signals to identify location of ground obstacles in proximity to the aircraft 102. Embodiments of the ground obstacle collision-avoidance system 100 generate a plan view of a region around the aircraft. The plan view presents one or more ground object icons that indicate the location of identified ground obstacles relative to the location of the aircraft 102. The generated plan view is then presented on a display that is viewable by the aircraft crew.

Alternative embodiments may be optionally configured to determine the likelihood of collision, or the potential of the risk of collision, with any identified ground obstacles. Then, a color and/or a presentation intensity of ground object icons associated with indicated ground obstacles shown on the generated plan view may be changed to indicate a higher risk of collision with a particular ground obstacle.

For example, a green color, grey color, or white color for a presented ground object icon may be used to indicate that the detected ground obstacle does not pose a hazard to the aircraft 102. A yellow color may be used to indicate that the detected ground obstacle poses a potential hazard (warning) to the aircraft 102. A red color may be used to indicate that the detected ground obstacle poses an imminent hazard (alarm) to the aircraft 102. Any suitable color may be used in the various embodiments.

Additionally, or alternatively, light intensity of the of presented ground object icons associated with indicated ground obstacles shown on the generated plan view may be brightened from a first level to a second level of increased brightness. The light intensity of the ground object icons associated with indicated ground obstacles shown on the generated plan view may be brightened from the first level to a third level of increased brightness to indicate that the detected ground obstacle poses an imminent hazard (alarm) to the aircraft 102. Flashing or the like may be used to increase awareness to the aircraft crew and/or the other parties, such as the ground crew. For example a first flashing rate may be associated with a warning and a second faster flashing rate may be associated with an alarm.

Additionally, an audible or other visible alert, such as a warning or an alarm, may be presented to the aircraft crew and/or the other parties, such as the ground crew. The audible alerts may be issued from a dedicated speaker or other suitable sound emitting device, or may be integrated into another system that is able to emit audible sounds. Visual alerts may be issued from a dedicated light or light emitting device, or may be integrated into another system that is able to emit visual alerts.

In an alternative embodiment, the generated plan view may be communicated to at least one remotely located ground obstacle alert indicator 108. For example, the ground obstacle alert indicator 108 may be located on the tow tug 124 so as to be viewable by a ground crew member operating the tow tug 124. Alternatively, or additionally, the ground obstacle alert indicator 108 may be located in, or incorporated as part of, an electronic flight bag that is being used in the cockpit of the aircraft 102 by the aircraft crew. Alternatively, or additionally, the ground obstacle alert indicator 108 may be located in a flight control tower or other remote location of interest to assist in the movement of the aircraft 102 over the ground. In some embodiments, the ground obstacle alert indicator 108 may be part of a multifunction system that includes a display that is used to present the generated plan view.

In the various embodiments, the ground obstacle collision-avoidance system 100 includes a display configured to present a graphical plan view presents one or more ground object icons that indicate the location of identified ground obstacles relative to the location of the aircraft 102. The presented ground object icons impart visual information to the aircraft or ground crew member, thereby indicating a potential risk of collision of the aircraft 102 with any identified ground obstacles in close proximity to the aircraft 102. Further, the ground obstacle icon is presented at a location on the display so as to indicate a location of the ground obstacle relative to the current location of the aircraft 102. Based upon information presented by the generated plan view illustrating location of one or more graphical ground obstacle icons, the aircraft and/or ground crew members may make a suitable evasive maneuver to avoid collision with the detected ground obstacle.

In some embodiments, the radar sensor modules 104 are implemented in aircraft light units that are also configured to emit visible or non-visible light for a variety of purposes. Typically, such aircraft light units are located at extremities of the aircraft 102. These aircraft extremities are likely to collide with various types of ground obstacles. Such aircraft lights may be colored navigation/position lights or anti-collision lights that emit colored light understood by others to be a warning signal. Other embodiments of the radar sensor modules 104 may be dedicated units that are installed on the exterior surface of the aircraft 102.

As illustrated in FIG. 1, a plurality of radar sensor modules 104 are at various locations on the aircraft 102. For example, radar sensor modules 104 are located at the wing tips of the left wing 110 and the right wing 112 of the aircraft 102. Since the wingtips extend outward from the fuselage 114 of the aircraft 102, detection of a ground obstacle in proximity to these radar sensor modules 104 may be used to assess the likelihood of a collision of the wings 110, 112 with the detected ground obstacle as the ground crew members are towing the aircraft 102 in a forward or a backward direction, and/or are towing the aircraft 102 during a turning maneuver.

Similarly, a plurality of radar sensor modules 104 may be located at the rear of the aircraft 102, such as at the tips of the left tail 116 and the right tail 118, and/or at the very end of the fuselage 114. Since the tails (horizontal stabilizers) extend outward from the fuselage 114 at the rear of the aircraft 102, detection of a ground obstacle in proximity to these radar sensor modules 104 may be used to assess the likelihood of a collision of the tails 116, 118 with a detected ground obstacle as the ground crew is towing the aircraft 102 in backward directions, and/or are towing the aircraft 102 during a turning maneuver. Similarly, since the end of the fuselage 114 is the farthest extent of the aircraft 102, detection of an object may also provide a useful indication of a potential collision with the ground obstacle.

A radar sensor module 104 may be located at the upper extent of a vertical stabilizer 120. Since the vertical stabilizer 120 extends upward from the fuselage 114 at the rear of the aircraft 102, and is typically the highest portion of the aircraft 102, detection of a ground obstacle in proximity to this radar sensor module 104 may be used to assess the likelihood of a collision of the vertical stabilizer 120 with the detected ground obstacle as the ground crew is towing the aircraft 102 in a forward or a backward direction. For example, the ground crew may be towing the aircraft 102 into a covered hangar. The radar sensor module 104 at the vertical stabilizer 120 would provide an alert or warning if there was insufficient height clearance for the vertical stabilizer 120 of the aircraft 102 to enter into the covered hangar.

Similarly, a plurality of radar sensor modules 104 may be located at the lower extent of the cowlings of the aircraft engines 122. Detection of a low height object on the ground in proximity to these radar sensor modules 104 may be used to assess the likelihood of a collision of the aircraft engines 122 with the detected ground obstacle. Such low height ground obstacles may be difficult to see, such as when the aircraft 102 is being moved in a backwards direction and the low height ground obstacle is blocked from view from the aircraft crew operating the aircraft and/or from the ground crew operating the tow tug 124.

Typically, the tow tug 124 couples to the landing gear structure at the forward portion, or nose 126, of the fuselage 114 of the aircraft 102. A tow structure 128 couples the tow tug 124 to the aircraft 102 so as to extend out the tow tug 124 from the aircraft 102, thereby improving visibility for the ground crew operator of the tow tug 124. The extension of the tow tug 124 out from the aircraft 102 also maintains a margin of space for safety purposes.

Figure 2:
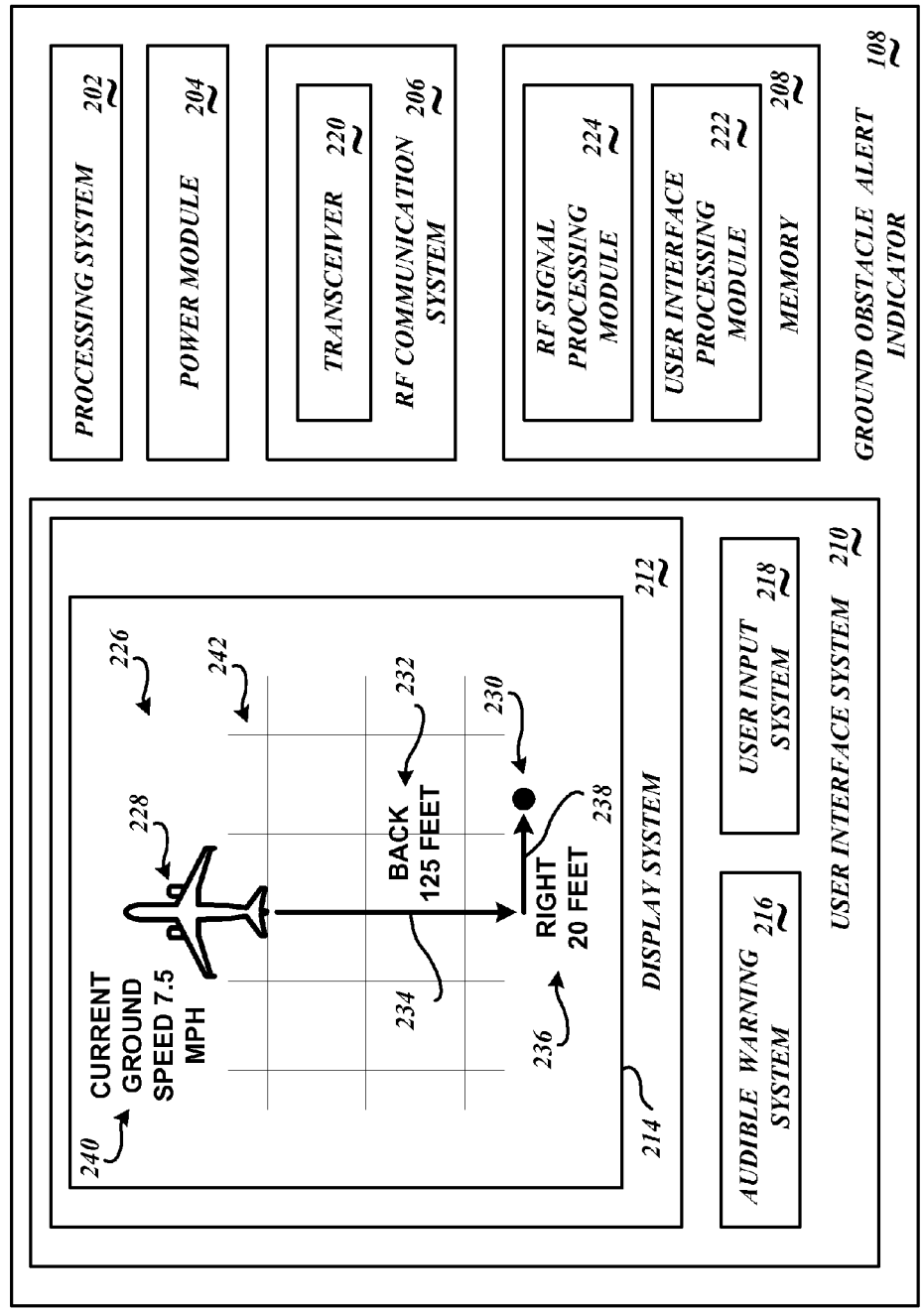
FIG. 2 is a block diagram of an embodiment of an exemplary ground obstacle alert indicator embodying the ground obstacle collision-avoidance system.

FIG. 2 is a block diagram of an embodiment of an exemplary ground obstacle alert indicator 108 embodying the ground obstacle collision-avoidance system 100. The ground obstacle alert indicator 108 comprises a processing system 202, an optional power module 204, an optional radio frequency (RF) communication system 206, an optional memory 208, and a user interface system 210. The user interface system 210 comprises a display system 212 with a display 214, an optional audible warning system 216 and an optional user interface 218. The RF communication system 206 comprises at least a transceiver 220. The memory 208 comprises portions for storing the user interface processing module 222 and the RF signal processing module 224.

Embodiments of the ground obstacle collision-avoidance system 100 generate a plan view 226 of a predefined area about the aircraft 102, wherein one or more of ground object icons associated with detected ground objects are shown on the generated plan view. The example plan view 226 illustrated in FIG. 2 presents an aircraft icon 228 corresponding to the aircraft 102. An extent of the plan view 226 is limited to a predefined area behind the installation aircraft 102 when the installation aircraft 102 is travelling in a backwards direction. When the installation aircraft 102 is travelling in a forwards direction, the extent of the plan view 226 is limited to a predefined area ahead of the installation aircraft 102. In some embodiments, the extent of the plan view 226 is limited to a predefined area about the installation aircraft when the installation aircraft is stopped so that any ground object icons associated with any detected ground object that are in proximity to the installation aircraft 102 may be shown. Such embodiments may be particularly beneficial in that individuals on the ground and that are in proximity to the installation aircraft 102 may be identified. The above-described predefined areas may be the same or may be different. Further, the extent of the predefined areas may be adjustable by a person or automatically adjustable based on ground speed of the aircraft 102.

The aircraft crew and/or the other parties, such as the ground crew, viewing the plan view 226 intuitively understand the relative position of the aircraft 102 in the presented plan view 226 based on the location of the aircraft icon 228. That is, a presentation location of the aircraft icon 228 on the plan view 226 provides a relative reference point for the current location of the installation aircraft 102. Any suitable image for the aircraft icon 228 may be used, here shown as an outline of an aircraft. Some aircraft icons 228 may represent a portion of the aircraft 102, such as the tail when the aircraft 102 is moving backwards, or the nose when the aircraft 102 is moving forward.

Further, the presentation location of the aircraft icon 228 may be at any suitable location on the plan view 226. For example, the aircraft icon 228 may be located at the very top center of the plan view 226. Such a top presentation location may be desirable with the aircraft 102 is moving backwards (reverse direction). The aircraft icon 228 may be located approximately at the center of the plan view 226. Such a central presentation location may be beneficial when the aircraft 102 is stopped and/or is moving in a region where ground obstacles may be ahead of, behind, and/or to the sides of the aircraft 102. The aircraft icon 228 may be located at the bottom of the plan view 226. A bottom presentation location may be beneficial when the aircraft 102 is moving in a forward direction.

In some embodiments, the presentation location of the aircraft icon 228 may be automatically adjustable based on the direction of movement of the aircraft 102. Alternatively, or additionally, the aircraft crew and/or the other parties, such as the ground crew, may manually adjust the presentation location of the aircraft icon 228 via the user input system 218. Further, the range of the plan view 226 (the extent of the distances about the aircraft 102) shown on the plan view 226 may be automatically adjustable based on aircraft speed, and/or may be manually adjusted by the aircraft crew and/or the other parties, such as the ground crew.

To illustrate hypothetical operation of the ground obstacle collision-avoidance system 100, a ground obstacle icon 230 is presented on the plan view 226 at a presentation location that is behind and to the right of the aircraft icon 228. Thus, the aircraft crew and/or the other parties, such as the ground crew, intuitively understand that there is a potential ground obstacle that is behind and to the right of the aircraft 102.

Some embodiments may be configured to indicate the relative distance of the ground obstacle icon 230 from the aircraft icon 228. For example, a first distance 232 (associated with the optionally presented arrow 234) of 125 feet is presented on the plan view 226 to indicate that the detected ground object is approximately 125 feet behind the tail of the aircraft 102. A second example distance 236 (associated with the optionally presented arrow 238) of 20 feet is presented on the plan view 226 to indicate that the detected ground object is approximately 20 feet to the right of the tail of the aircraft 102. Thus, the second distance 236 indicates a distance of the detected ground obstacle to the side of (to the right of or to the left of) the installation aircraft.

Alternatively, or additionally, grid lines 242 may be presented on the plan view 226. Here, the example grid lines 242 are based on a Cartesian coordinate system. Such grid lines 242 would indicate relative distances from the installation aircraft 102. The grid lines 242 are illustrated to create square grids of a predefined distance that is readily understood by the viewing aircraft crew and/or the other parties, such as the ground crew. Alternatively, the grid lines 242 may be presented based on a polar coordinate system radiating out from a selected location on the aircraft 102, such as the tail, the nose, or the center of the aircraft 102. Grid lines 242 may be presented with reference to other selected portions of the aircraft. For example, grid lines 242 may line up (align) with the extents of the aircraft wings and/or tail.

Supplemental information 240 may be presented on the plan view 226. For example, but not limited to, the example plan view 226 indicates that the current ground speed of the aircraft 102 is 7.5 miles per hour (MPH). Optionally, the direction of travel may be indicated, such as a backwards or a forwards travel direction. Any suitable information of interest may be included on the plan view 226 at any suitable presentation location.

In the various embodiments, the processing system 202 may be any suitable processor or device. The processing system 202 may be a commercially available processor. In other embodiments, the processing system 202 may be a firmware implementation. The processing system 202 may be a specially designed and fabricated processor.

Other components may be optionally included in the ground obstacle alert indicator 108. Alternatively, one or more of the components of the example ground obstacle alert indicator 108 may reside in other convenient locations, such as when the ground obstacle alert indicator 108 is integrated into the dashboard of the tow tug 124, integrated into an aircraft display system, integrated into an EFB, or another system having or coupled to a display. Some embodiments may be integrated into an aircraft collision avoidance system (ACAS) or other on-board aircraft warning system.

In the various embodiments, the processing system 202 processes the radar return signal information received from the gateway unit 106 into information corresponding radar information that identifies the location of and/or distance (range) from the portion of the aircraft 102 (having the detecting radar sensor module 104) and the detected ground obstacle. In some embodiments, the ground obstacle alert indicator 108 is configured to directly receive radar sensor information from the individual radar sensor modules 104.

Alternatively, some embodiments of the gateway unit 106 may process the radar return signal information received from the radar sensor modules 104 into information that identifies the location of and/or range from the portion of the aircraft (having the detecting radar sensor module 104) and the detected ground obstacle. In such embodiments, the gateway unit 106 determines the appropriate alert control signals and ground obstacle location information that are communicated to the ground obstacle alert indicator 108. Accordingly, the ground obstacle alert indicator 108 simply presents the icons associated with indicated ground objects shown on the generated plan view that is presented on the display 214 and/or issues the commanded alert. Such embodiments may be useful when a plurality of ground obstacle alert indicators 108 are deployed, such as when a ground obstacle alert indicators 108 are implemented in the cockpit of the aircraft 102, when one of the ground obstacle alert indicators 108 is installed on or integrated into the tow tug 124, and/or when one or more other ground obstacle alert indicators 108 are implemented in portable hand held devices carried by the crew members (such as an EFB).

In an example embodiment, the ground obstacle alert indicator 108 is configured to receive the radar return signal information from the gateway unit 106 and/or the radar sensor modules 104 via RF signals. The processing system 202, executing the RF signal processing module 224, processes the radar return signal information in a received RF signal into information that is suitable for processing by the processor 202. Other embodiments may be configured to receive information from the gateway unit 106 and/or the radar sensor modules 104 using any suitable communication medium, including other wireless mediums or a wire-based medium.

In such RF communication-based embodiments, the RF signals may be encrypted for security purposes. Alternatively, or additionally, identifiers of the aircraft 102 and/or the ground obstacle alert indicators 108 may ensure that only the towed aircraft 102 is providing information to the ground crew members that are currently towing the aircraft 102.

In the various embodiments, the transceiver 220 is a receiver device configured to receive RF signals from the gateway unit 106 or another device. For example, software updates or software modifications to the user interface processing module 222 and/or the RF signal processing module 224 may be received from time to time. In other embodiments, the transceiver 220 may also be a transmitter device configured to transmit RF signals to the gateway unit 106 or to another device. For example, confirmation of the issuance of an alert may be transmitted to verify that the ground crew has been notified of a potential collision with a detected ground obstacle.

The power module 204 may be included to provide power to one or more of the components of the ground obstacle alert indicator 108. In some situations, current and/or voltage requirements of the components of the ground obstacle alert indicator 108 may be different from the power (voltage and/or current) provided by the power supply of the tow tug 124 or by batteries installed in the ground obstacle alert indicator 108. Accordingly, the power module 204 may be configured to condition the received power, such as by changing the voltage and/or current characteristics of the received power. For example, embodiments of the power module 204 may include transformers, DC/DC voltage converters, and/or DC/AC converters. Any suitable power module 204, and/or suitable components, may be used.

The user input system 218 may comprise a plurality of controllers, such as buttons, dials or the like, to control various operational characteristics of the ground obstacle alert indicator 108. The processing system 202, executing the user interface processing module 222, may implement the user modifications to these operating characteristics. In some embodiments, the display 214 may be a touch sensitive screen wherein the controllers are shown as adjustable graphical icons or the like.

In an example embodiment, a controller may be configured to adjust a lighting intensity of the display 214 so that display light output intensity can be adjusted based on current ambient lighting conditions. As another example, a controller may be configured to adjust volume of an output audible warning or alarm so that the output sound may be adjusted for background noise levels.

Figure 3:
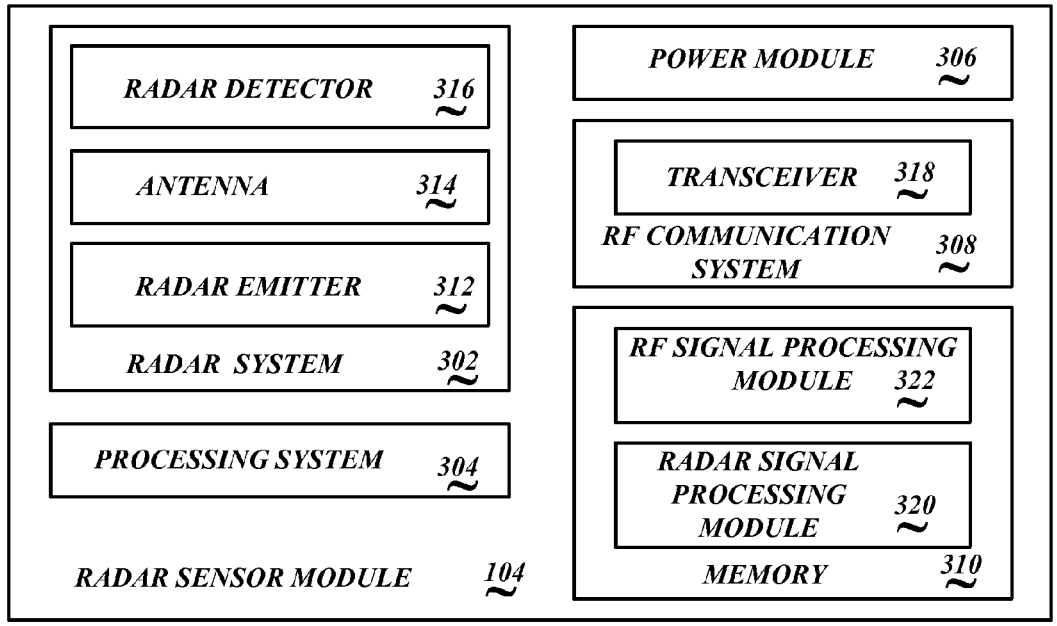
FIG. 3 is block diagram of an example embodiment of a radar sensor module.

FIG. 3 is block diagram of an example embodiment of a radar sensor module 104. The radar sensor module 104 comprises a radar system 302, a processing system 304, an optional power module 306, a radio frequency (RF) communication system 308, and an optional memory 310. The radar system 302 comprises a radar emitter 312, an antenna 314, and a radar detector 316. The RF communication system 308 comprises at least a transceiver 318. In some embodiments, the transceiver 318 may be limited to a suitable RF transmitter device. The memory 310 comprises portions for storing a radar signal processing module 320 and an RF signal processing module 322.

The processing system 304 may be any suitable processor or device. The processing system 304 may be a commercially available processor. In other embodiments, the processing system 304 may be a firmware implementation. The processing system 304 may be a specially designed and fabricated processor.

Other components may be optionally included in the radar sensor module 104. In an example embodiment, the radar sensor module 104 is integrated into an aircraft light module (fixture). Since aircraft lights may be located at the various farthest extents of the aircraft 102, the radar sensor modules 104 will be located at the closest anticipated points of collision with ground obstacles. Alternatively, one or more of the components of the example radar sensor module 104 may reside in other convenient locations of the aircraft 102, and may even be a stand-alone device that is mounted or affixed to the exterior surface of the aircraft at any suitable location of interest.

A new generation of high intensity light emitting diode (LED) lamps are becoming increasingly available for aircraft lighting applications. Because of the relatively small size of the LEDs, in comparison to traditional incandescent or other types of lamps used in traditional aircraft light modules, vacant space or room in the light module may be available. In the various embodiments, a radar sensor and other electronic devices are incorporated into the light module to form a radar sensor module 104. The light fixture-based radar sensor module is designed to fixably couple to an existing light module receptacle on the exterior surface of the aircraft 102.

Further, the radar sensor module 102 may be further configured to communicate radar information using a radio frequency (RF) medium or other suitable wireless signal medium. The RF communication system 308 generates and transmits a RF signal that is received by the gateway unit 106. In some embodiments, the transceiver 318 is a RF transmitter that transits, or communicates, the radar return signal information for a distance that is at least detectable by the gateway unit 106. In other embodiments, the transceiver 318 is configured to receive RF signals from the gateway unit 106 or another device. For example, software updates or software modifications to the radar signal processing module 320 and/or the RF signal processing module 322 may be received from time to time.

Such RF signal-based embodiments are particularly suitable to retrofits for existing aircraft 102. Further, since no additional wiring or structural modifications (or at least minimal wiring or structural modifications) are required to add the ground obstacle collision-avoidance system 100 to a legacy aircraft 102, regulatory review and approval for modifications to the aircraft 102 may be avoided, or at least mitigated.

The radar emitter 312 is configured to generate the radar signals which are emitted from the antenna 314 in a direction of interest. The antenna 314 is further configured to receive radar return signals that may be reflected from any ground obstacles that are within a detection range of the radar emitter 312. The radar detector 316 receives the radar return signals from the antenna 314 and processes the received radar return signals into radar return signal information. The radar return signals are associated with reflections of the emitted radar signal that are reflected from a nearby ground obstacle.

The processing system 304 is configured to receive the radar return signal information from the radar detector 316. In some embodiments, the processing system 304, executing the radar signal processing module 320, may further process the radar return signal information into information corresponding radar information that identifies the location of and/or range to any detected ground obstacles. The processing system 304, executing the RF signal processing module 322, processes the radar return signal information into information that is suitable for communicating in a RF signal by the RF communication system 308.

The power module 306 may be included to provide power to one or more of the components of the radar sensor module 104. Is some situations, current and/or voltage requirements of the components of the radar sensor module 104 may be different from the power (voltage and/or current) provided to illuminate the LEDs of an aircraft light having the radar sensor module 104 therein. The power module 306 is configured to receive a sufficient amount of power from the aircraft 102, preferably using existing power supply components and connectors in the case of a retrofit application. The power module 306 may also be configured to condition the received power, such as by changing the voltage and/or current characteristics of the received power. For example, embodiments of the power module 306 may include transformers, DC/DC voltage converters, and/or DC/AC converters. Any suitable power module 306, and/or suitable components, may be used.

The aircraft light module having the radar sensor module 104 therein preferably comprises a plurality of connectors which may be easily decoupled from mating connectors of a corresponding coupling unit on the aircraft 102 during replacement of the aircraft light module. One or more of the connectors in the coupling unit are configured to receive power for lighting of the LEDs or other types of lamps. In an example embodiment, when the aircraft light module is turned on (actuated) during taxiing or the like, the radar sensor module 104 receives power and becomes operational. When the aircraft light module is off (deactivated), then power is not provided to the radar sensor module 104, and is thus not operational.

In other embodiments, power is continuously available over the power connection. Control signals are provided to the aircraft light module which causes illumination of the aircraft light module LEDs. In such embodiments, power is continuously available to the radar sensor module 104. In some embodiments, the radar sensor module 104 is continuously operational, and is therefore detecting for the presence of any obstacles or hazards that are within a detection range of the radar emitter 312.

In other embodiments, the ground crew or other operator provides a control signal that causes the radar sensor module 104 to become operational. Alternatively, or additionally, the control signal that causes the radar sensor module 104 to become operational is provided by another electronic system or electronic device, such as, but not limited to, as controller associated with a device that is used for towing the aircraft 102.

In the various embodiments, the orientation of the radar emitter 312 is selected so that the emitted radar signals are emitted in a direction of interest, or field of view (FOV) that is associated with the possible occurrence of a collision with a ground obstacle. For example, the radar emitter 312 when located at the tips of the wings 110, 112, may be oriented along a horizontal plane to detect presence of objects at the same height of the wings 110, 112. In some embodiments, the radar emitter 312 may also be oriented in a forward-looking direction so as to sense objects that are in front of the wings 110, 112. Alternatively, or additionally, the radar emitter 312 may also be oriented in a backward-looking direction so as to sense objects that are behind the wings 110, 112. In some embodiments, multiple radar emitters 312 may be used to provide radar coverage about an area of interest. For example, but not limited to, two radar emitters 312 may be employed, one oriented in a forward direction, and one oriented in a backward direction. Embodiments of the radar sensor modules 104 may employ any desired number of radar emitters 312. Further, embodiments may include any suitable number of antennas 314 and/or radar detectors 316 necessary to emit radar signals, and to receive and detect radar reflections.

The fields of view (FOVs) of the radar sensor modules 104 provide a desired coverage of a region of space around the aircraft 102. The FOV parameters are derived from typical accident geometry and functional requirements. Any blind spots surrounding the aircraft 102 are based on the FOV of one candidate technology (radar) and constraints associated with placing the radars inside the light modules. Other FOVs are possible, depending upon where the radar system 302 is placed within the light module.

The thresholds for sensor FOVs may be assessed based on the particular region of space required for the landing of the aircraft 102. Further, sensor FOVs may be defined based on regulatory requirements which specify a minimum distance threshold from hazards or obstacles during the movement of the aircraft 102.

In an example embodiment, the radar sensor module 104 and the gateway unit 106 include OneWireless™ devices produced by Honeywell, Inc. and adapted to ACAS system requirements. Special antennas are used with these devices to ensure proper link power budget. Other wireless protocols may be used, such as 802.11 (WLAN) radio technology.

Figure 4:
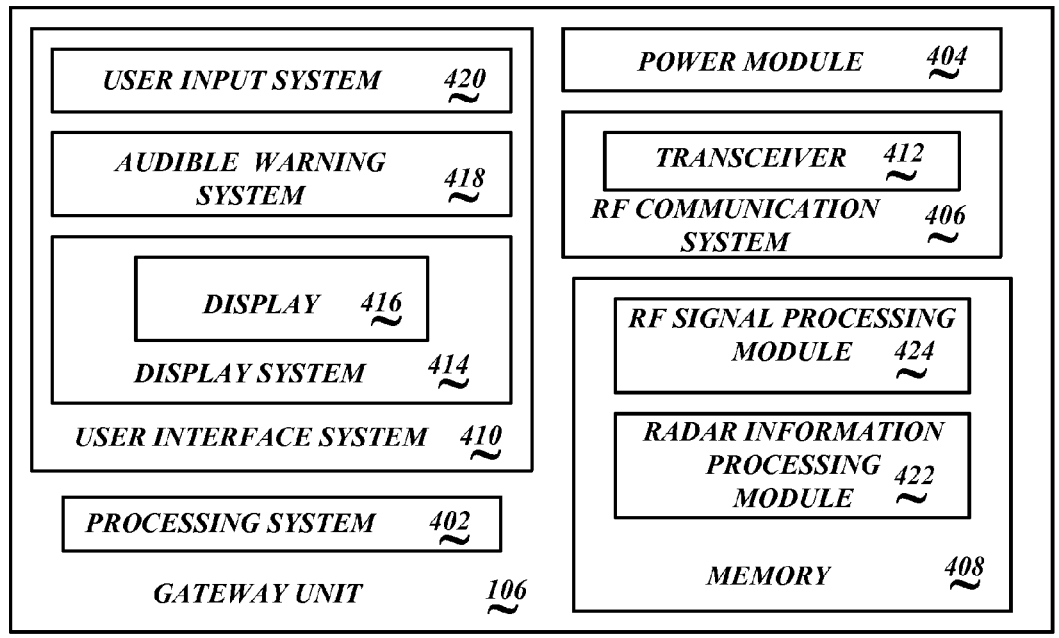
FIG. 4 is block diagram of an example embodiment of a gateway unit.

FIG. 4 is block diagram of an example embodiment of a gateway unit 106. The gateway unit 106 comprises a processing system 402, a power module 404, a RF communication system 406, a memory 408, and an optional user interface system 410. The RF communication system 406 comprises a transceiver 412. The user interface system 410 comprises a display system 414 with an optional display 416, an optional audible warning system 418, and an optional user input 420. The memory 408 comprises portions for storing the radar information processing module 422 and the RF signal processing module 424.

The processing system 402 may be any suitable processor or device. The processing system 402 may be a commercially available processor. In other embodiments, the processing system 402 may be a firmware implementation. The processing system 402 may be a specially designed and fabricated processor. In some embodiments, the processing system 402 may be a component of another system or device which receives the radar information from the radar sensor modules 104 or from the RF communication system 406.

Other components may be optionally included in the gateway unit 106. Alternatively, one or more of the components of the example gateway unit 106 may reside in other convenient locations within the aircraft 102.

In an example embodiment, the RF communication system 406 receives the RF signals transmitted by the radar sensor modules 104. In such embodiments, the transceiver 412 is a RF receiver that receives the communicated radar return signal information for a distance that is at least within the broadcast range of the radar sensor modules 104. In the various embodiments, the transceiver 412 may be configured to transmit RF signals to the radar sensor module 104 or another device. For example, updates or modifications to the radar information processing module 422 and/or the RF signal processing module 424 in the radar sensor modules 104 may be transmitted from time to time.

In a wire-based embodiment that is configured to receive radar information from one or more of the radar sensor modules 104 using a wire-based communication media, the example RF communication system 406 may be replaced with a suitable wire-based communication system. Some embodiments may be configured to receive both RF signals and wire-based signals for the radar sensor modules 104 and/or from other devices.

The processing system 402, executing the RF signal processing module 424, processes the RF signal information received from the radar sensor module 104 into radar information. The processing system 402, executing the radar information processing module 422, further processes the radar information into alert information that is suitable for communicating to the ground obstacle alert indicator 108.

In some embodiments, the optional user interface system 410 may be used to provide warning and/or advisories of any detected obstacles or hazards that are within a detection range of the radar sensor modules 104. For example, the gateway unit 106 may be located in the cockpit of the aircraft 102. In such an embodiment, the processing system 402 generates graphical display information that is presentable on the optional display 416. The graphical information presented on the display 416 may be similar to the plan view 226 provided by the ground obstacle alert indicator 108. Accordingly, the crew viewing the display 416 appreciates the nature of any detected obstacles or hazards that are within a detection range of the radar sensor modules 104 as their aircraft is being taxied or otherwise moved by the ground crew members. Thus, the crew of the aircraft 102, if present during towing, will receive the same alerts as the ground crew members.

Alternatively, or additionally, graphical display information may be communicated to a remote display, and/or may be communicated to another system. For example, the graphical display information may be communicated to an electronic flight bag or the like. Alternatively, or additionally, the graphical display information may be communicated to an onboard radar system.

In some embodiments, the audible warning system 418 may be configured to issue an audible warning or alert to the crew of the aircraft 102 in the event that any objects are within a detection range of the radar sensor modules 104. The audible warning system 418 may be located at a convenient location within the cabin of the aircraft 102. In other embodiments, a signal may be communicated to another audible warning system so that an audible alert or warning may be issued.

The user input system 420 is configured to receive input from the crew of the aircraft 102 or by another individual, such as the maintenance crew. In some embodiments, the user input system 420 may be used to input a command that actuates the operation of the gateway unit 106, one or more of the radar sensor modules 104, and/or one or more of the ground obstacle alert indicators 108. Additionally, or alternatively, the crew may set and/or adjust a distance threshold that is used to generate alerts in the event that any obstacles or hazards that are within a distance threshold from the aircraft 102.

The optional power module 404 provides power to the components of the gateway unit 106. When the aircraft 102 is retrofitted with an embodiment of the ground obstacle collision-avoidance system 100, a single and conveniently accessible source of power on the aircraft 102 may be provided to the power module 404. The power module 404 may then provide power to one or more of the components of the gateway unit 106.

Figure 5:
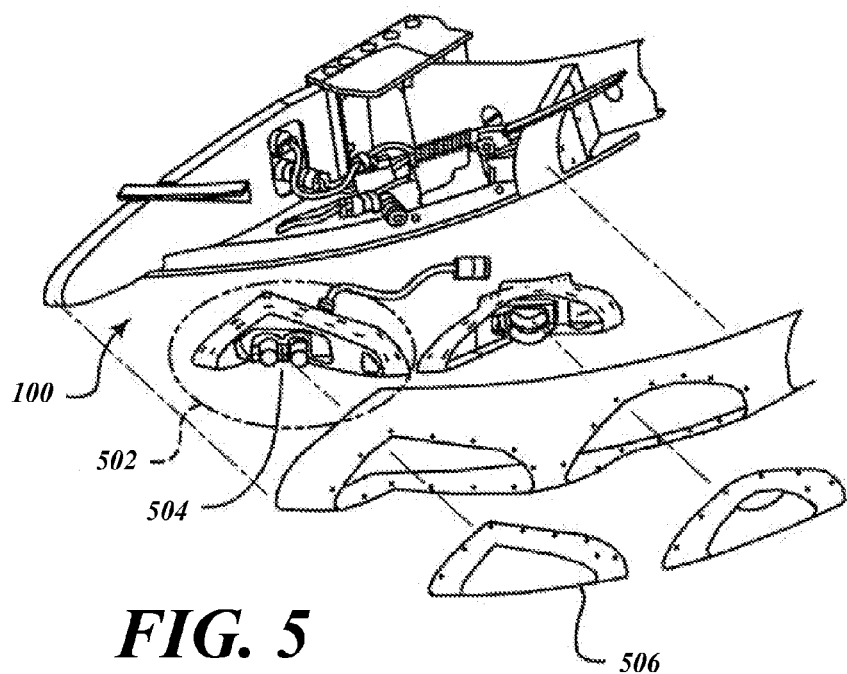
FIG. 5 shows an example light compartment of an example aircraft light with a radar sensor module.

In some situations, current and/or voltage requirements of the components of the gateway unit 106 may be different from the accessed power (voltage and/or current). In such instances, the power module 404 is configured to condition the received power, such as by changing the voltage and/or current characteristics of the received power. For example, embodiments of the power module 404 may include transformers, DC/DC voltage converters, and/or DC/AC converters. Any suitable power module 404, and/or suitable components, may be used as is understood by one skilled in the art FIG. 5 shows an example light compartment 502 of an example aircraft light with a radar sensor module 104, such as, but not limited to, the navigation/position light or an anti-collision light. The compartment 502 includes a position light 504 with two LED assemblies or two halogen bulbs (based on the lighting version requirements). The light compartment 502 includes:

Antenna—e.g., 2-4 cm. The antenna is located behind a glass cover 506; the other parts are made of aluminum or composites, which would increase signal attenuation.

radar sensor module 104 with an antenna mounted on or in the glass 506.

In example embodiments, the radar system 302 is an industrial, scientific, and medical (ISM) 2.4 GHz band and distance-measurement radar with related electronic gear. In one embodiment, a sensor node antenna for the ISM band wireless communication of the gateway unit 106 is included in the position-light compartment. In one embodiment, the antenna is placed under a light glass light cover, which is expected to be transparent for RF signal communication. The antenna also provides sufficient gain for the errorless communication with the gateway unit 106.

In some embodiments, a directional antenna is used. The directional antenna requires more space than omnidirectional dipoles do. Basically, there are at least two suitable directional antenna types, Yagi and patch antennas. Both provide directional characteristics, though any suitable antenna 314 may be used. The Yagi is flat and long in the direction of the main lobe; the patch antenna requires more space in the plane perpendicular to the main lobe axis. This means that Yagi antennas' front elements could interfere with the position light. On the other hand, the patch antenna requires more space between position-light components (LED reflectors, radar antenna lens).

Figure 6:
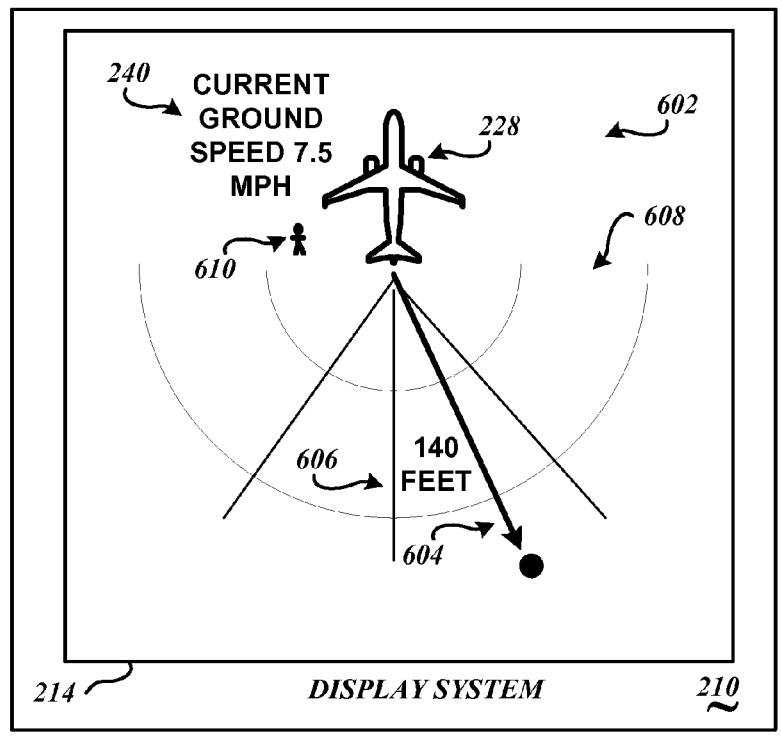
FIG. 6 illustrates an alternative graphical user interface presentation on the display of the ground object alert indicator.

FIG. 6 illustrates an alternative plan view 602. In this example embodiment, distances from the detected ground obstacle is indicated using a vector 604. Text 606 indicates the range (distance) of the ground object from the aircraft 102, or from a predefined portion of the aircraft 102, such as the tail. Here, grid lines 608 are presented using a polar coordinate system.

In some embodiments, persons may be identified as ground obstacles. For example, the presented ground obstacle icon 610 corresponds to a detected person. Here, the ground obstacle icon 610 is presented as an image of a person or individual. Thus, the aircraft crew readily appreciate the location of ground crew when in proximity to the aircraft 102.

In the various embodiments, the radar emitter 312, the radar antenna 314, and the radar detector 316 cooperatively operate to obtain radar information to identify ground obstacles in proximity to their respective radar sensor module 104. Based on the strength of the radar signal emitted by the radar emitter 312, the directionality of the radar antenna 314, and/or the sensitivity of the radar detector 316, the radar sensor modules 104 may detect a ground obstacle that may be in close enough proximity to potentially cause a collision with a portion of the aircraft 102. However, the radar sensor modules 104 may also detect ground obstacles that are sufficiently far away from the aircraft 102 so as to not be a potential collision hazard. Accordingly, embodiments of the ground obstacle collision-avoidance system 100 are configured to discriminate between detected ground obstacles that may be in close enough proximity to potentially cause a collision, and detected ground obstacle that are not in close enough proximity to potentially cause a collision.

In an example embodiment, at least one of the strength of the radar signal emitted by the radar emitter 312, the directionality of the radar antenna 314, and/or the sensitivity of the radar detector 316 are configured to limit the detection range of the radar sensor modules 104 to a relevant detection range. If the ground obstacle is outside of (farther away from) the relevant detection range, then the radar sensor modules 104 will not detect the ground obstacle. Accordingly, the ground obstacle alert indicator 108 will not issue an alert.

Alternatively, or additionally, the range (or distance) from the detected ground obstacle may be determined. The range of the ground obstacle from the radar sensor modules 104 may be determined by the radar sensor modules 104, the gateway unit 106, and/or the ground obstacle alert indicator 108 depending upon the embodiment.

The determined range is compared against a predefined range threshold. If the determined range is greater than the range threshold, then the likelihood of collision with the ground obstacle is sufficiently low that the ground obstacle alert indicator 108 will not issue an alert. On the other hand, if the determined range is at least equal to the range threshold, the ground obstacle alert indicator 108 will issue an alert. The comparison of the determined range with the range thresholds may be performed by the radar sensor modules 104, the gateway unit 106, and/or the ground obstacle alert indicator 108 depending upon the embodiment In some embodiments, multiple range thresholds may be used. Different range thresholds may be used depending upon the particular location of the particular radar sensor module 104 that detects the ground obstacle. For example, a first range threshold may be used for radar sensor modules 104 located at the wing tips of the aircraft 102, a second range threshold (that is less than the first range threshold) may be used for radar sensor modules 104 located at the rear of the aircraft 102, and a third range threshold (that is less than the first range threshold and/or the second range threshold) may be used for radar sensor modules 104 located on the engines 122 of the aircraft 102.

Additionally, or alternatively, a first range threshold may be used to generate a warning type alert. Then, a second range threshold (that is less than the first range threshold) may be used for generating an alarm type alert. Other range thresholds may be used to discriminate between other alert levels.

Further, the predefined range thresholds may be adjustable. In some embodiments, the ground crew member or other personnel may selectively specify or adjust the range thresholds. Alternatively, or additionally, the range thresholds may be automatically adjusted based on aircraft velocity and/or direction when being towed. The adjustment to the range thresholds may be performed by the radar sensor modules 104, the gateway unit 106, and/or the ground obstacle alert indicator 108 depending upon the embodiment.

In alternative embodiments, one or more of the sensor modules may use an alternative type of sensor. That is, rather than a radar sensor, the sensor module may be based on acoustic, sonar, or optical signal sensing.

In an example embodiment, the emitter is an acoustic emitter, such as a speaker or the like, that emits sound signals. The emitted sound may, in some embodiments, have a frequency that is not discernable by a human. The detector is an acoustic detector, such as a microphone or the like, that detects reflected sounds from a ground obstacle.

In another example embodiment, the emitter is a light emitter that emits light signals. The emitted light may, in some embodiments, have a frequency that is not discernable by a human, such as infrared light, ultraviolet light, or the like. The detector is a light detector that detects reflected light from a ground obstacle.

In yet another example embodiment, the detector may be a camera which processes visual images based on light emitted by a light on the aircraft, by light emitted by other lamps or emitted from other lighting fixtures, or from ambient light. Image processing techniques may be used to identify ranges from objects that the aircraft may collide with.

In other embodiments, a laser detection and ranging (LIDAR) system may be employed. Other emitters configured to emit non-visible light energy may be used, wherein the detector is configured to detect the presence of objects.

Accordingly, each of a plurality of sensor modules detect a ground obstacle using a sensor and transmit information associated with the detected ground obstacle to a gateway unit 106, wherein each of the plurality of sensor modules are uniquely located on a surface of an aircraft that is at risk for collision with a ground obstacle while the aircraft is being towed. Then, at the gateway unit, the information transmitted from the sensor module is received. Then, information associated with the received sensor information is transmitted to the ground object alert indicator.

Figure 7:
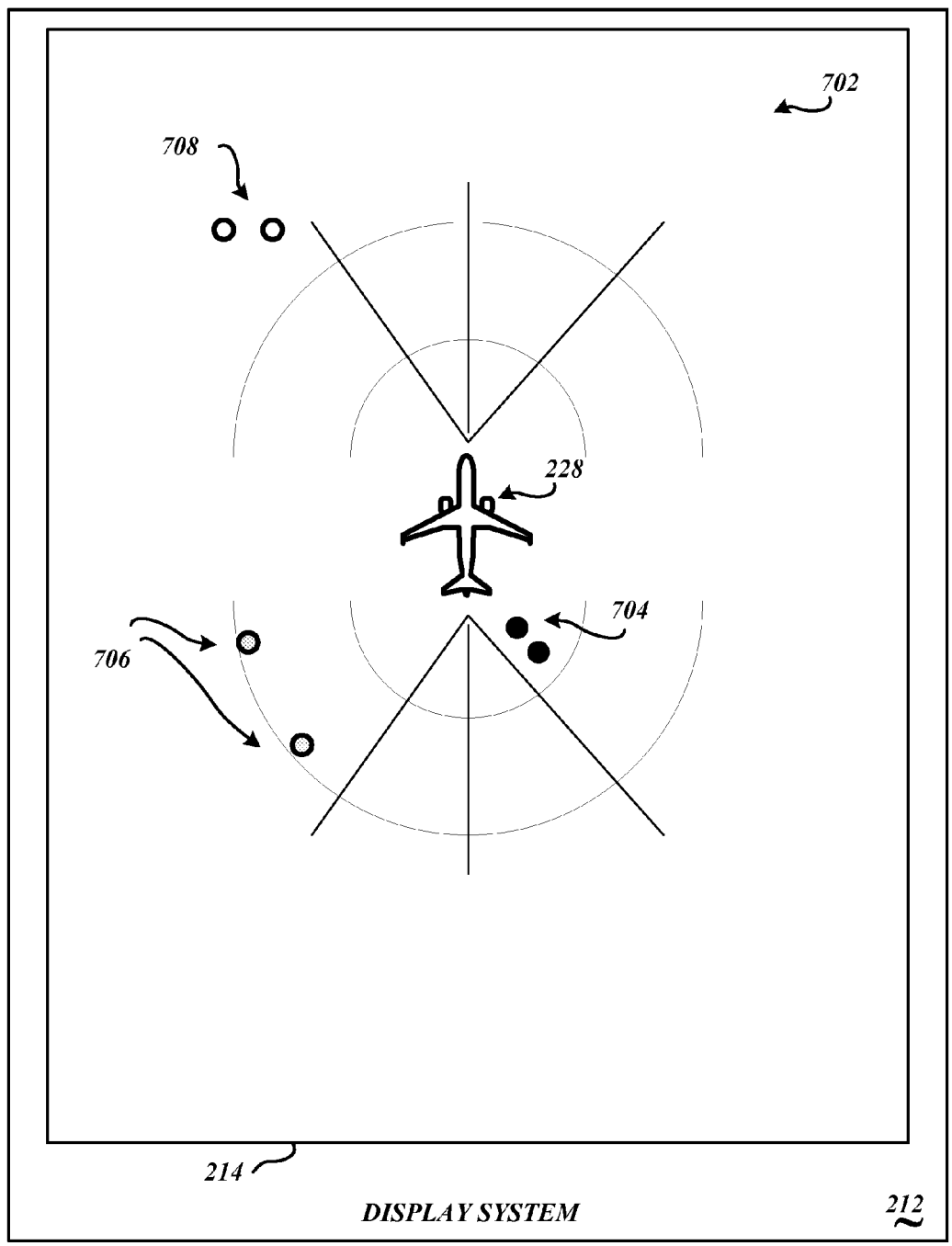
FIG. 7 illustrates an alternative plan view illustrating multiple detected ground objects in proximity to the aircraft.

FIG. 7 illustrates an alternative plan view 702 illustrating multiple detected ground object icons 704, 706, 708 in proximity to the aircraft 102. The extents of the plan view 702 are great enough so as to present a plan view that encompasses a large area about the aircraft 102.

Here, the detected ground object icons 704 are in relatively close proximity to the aircraft 102 (indicated by the aircraft icon 228). Since the detected ground objects associated with the detected ground object icons 704 may present a hazard to the aircraft 102, the detected ground object icons 704 are shown in a first color (here, with black shading). The illumination level may be very bright for the presented detected ground object icons 704 to indicate that the associated ground objects may be a potential hazard to the aircraft 102.

Further, the other detected ground object icons 706 are in proximity to the aircraft 102 (indicated by the aircraft icon 228), yet are farther away from the presented detected ground object icons 704. Since the detected ground objects associated with the detected ground object icons 706 are likely to only present a minimal chance of hazard to the aircraft 102, the detected ground object icons 706 are shown in a second color (here, with grey shading). The illumination level may be lighter (than the illumination level of the presented detected ground object icons 704) to indicate that the associated ground objects present a reduced potential hazard to the aircraft 102.

The detected ground object icons 708 are in relatively far away from the aircraft 102 (indicated by the aircraft icon 228). Since the detected ground objects associated with the detected ground object icons 708 do not present a hazard to the aircraft 102, the detected ground object icons 704 are shown in a third color (here, with white shading). The illumination level may be relatively low for the presented detected ground object icons 708 to indicate that the associated ground objects are not likely to be a potential hazard to the aircraft 102.

In some embodiments, particular ground object icons associated with detected ground objects may use different shapes and/or outlines to indicate other characteristics of the detected ground object. For example, if the detected ground object is a tow tug 124, the presented ground object icon may be in the form of the outline of a tow tug, a line drawing of a tow tug, or even a photographic of a tow tug. As another non-limiting example, if the detected ground object is another aircraft, the presented ground object icon may be in the form of an aircraft. As another non-limiting example, if the detected ground object is a person, the presented ground object icon may be in the form of an outline of an individual, or as a stick figured (a very simple drawing of a person composed of a few lines, curves, and/or dots).

In some embodiments, height of a detected ground object may be determinable from information collected by the various sensors. If height information pertaining to the height of a detected ground object is available, the height of the detected ground object may be indicated as text on the presented plan view 226.

For example, text indicating that the height of the detected ground object is "3 Feet" may be shown on the plan view 226. This height may be low enough so that the wings of the aircraft 102 may safely pass over the detected ground object. Thus, the aircraft 102 may not need to change its planned path.

On the other hand, the height of the detected ground object may be "20 Feet" and may be shown on the plan view 226. This height may be too high for the wings of the aircraft 102 to safely pass over. Thus, the aircraft 102 may need to change its planned path or stop until the ground object is moved.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ground obstacle collision-avoidance system comprising:
   a plurality of radar sensor modules each located at a selected different location on an exterior of an installation aircraft, wherein each radar sensor module comprises:
      a radar emitter configured to emit a radar signal; and
      a radar detector configured to receive a radar return signal associated with reflections of the emitted radar signal that are reflected from the ground obstacle,
      wherein the radar sensor module is configured to communicate radar information corresponding to the detected radar return signal;
   a processing system configured to determine a distance from the installation aircraft to a detected ground obstacle that has been detected by at least one of the plurality of radar sensor modules, determine a type of the detected ground obstacle, and generate a plan view indicating at least one aircraft icon, a graphical ground obstacle icon that is associated with the detected ground obstacle, and text indicating the distance from the installation aircraft to the detected ground obstacle; and
   a display configured to present the plan view,
   wherein a presentation location of the aircraft icon on the plan view provides a relative reference point for the installation aircraft,
   wherein a presentation location of the graphical ground obstacle icon relative to the at least one aircraft icon indicates a location of the detected ground obstacle relative to the installation aircraft, and
   wherein a shape of the graphical ground obstacle icon indicates the type of the detected ground obstacle.

2. The system of claim 1, wherein the distance is a first distance, wherein the first distance indicates a distance that the detected ground obstacle is behind the installation aircraft, and wherein the plan view further presents text indicating a second distance corresponding to a distance of the detected ground obstacle to a side of the installation aircraft.

3. The system of claim 1, wherein the plan view further presents grid lines based on a polar coordinate system, wherein the grid lines radiate from a location of a tail of the at least one aircraft icon.

4. The system of claim 1, wherein the plan view further comprises a plurality of grid lines based on a Cartesian coordinate system, wherein the grid lines indicate relative distances from the installation aircraft, wherein first and second grid lines align with the extents of the aircraft wings of the at least one aircraft icon, and wherein a third grid line aligns with a tail of the at least one aircraft icon.

5. The system of claim 1, wherein the plan view further presents supplemental information indicating at least one of a ground speed of the installation aircraft, or a forward or backward direction of travel of the installation aircraft.

6. The system of claim 1, wherein an extent of the plan view is limited to a first predefined area behind the installation aircraft when the installation aircraft is travelling in a backwards direction, and wherein the extent of the plan view is limited to a second predefined area ahead of the installation aircraft when the installation aircraft is travelling in a forwards direction.

7. The system of claim 6, wherein an extent of the plan view is limited to a predefined area about the installation aircraft when the installation aircraft is stopped.

8. The system of claim 1, wherein the detected ground obstacle is a tow tug, and the presented graphical ground obstacle icon is an outline of the tow tug, a line drawing of the tow tug, or a photograph of the tow tug.

9. The system of claim 1, wherein the detected ground obstacle is a person, and the presented graphical ground obstacle is an outline of the person or a drawing of the person.

10. The system of claim 1, further comprising:
a gateway unit communicatively coupled to the plurality of radar sensor modules and configured to receive the radar information communicated from the plurality of radar sensor modules,
wherein the plurality of radar sensor modules each further comprise a radio frequency (RF) system configured to wirelessly transmit the radar information associated with the received radar return signal, and
wherein the gateway unit further comprises the RF system configured to wirelessly receive the radar information transmitted from the plurality of radar sensor modules.

11. The system of claim 1, further comprising an audible warning system configured to issue an audible alert.

12. The system of claim 1, further comprising a hand held device comprising the display.

13. A method comprising:
at each of a plurality of radar sensor modules,
emitting, from a radar emitter, a radar signal;
receiving, at a radar detector, radar return signals corresponding to reflections of the emitted radar signal from a ground obstacle; and
transmitting radar information associated with the received radar return signal reflections reflected from the ground obstacle,
wherein each of the plurality of radar sensor modules are uniquely located on a surface of an aircraft that is at risk for collision with the ground obstacle while the aircraft is being towed;
at a gateway unit,
receiving the radar information transmitted from the radar sensor module; and
transmitting information associated with the received radar information, and at a processing system,
determining a distance from the installation aircraft to a detected ground obstacle detected by at least one of the plurality of radar sensor modules; and
determining a type of the detected ground obstacle;
on a display, presenting a plan view indicating at least one aircraft icon, a graphical ground obstacle icon that is associated with the detected ground obstacle, and text indicating the distance from the installation aircraft to the detected ground obstacle,
wherein a presentation location of the aircraft icon on the plan view provides a relative reference point for the installation aircraft,
wherein a presentation location of the graphical ground obstacle icon relative to the at least one aircraft icon indicates a location of the detected ground obstacle relative to the installation aircraft, and
wherein a shape of the graphical ground obstacle icon indicates the type of the detected ground obstacle.

14. The method of claim 13, wherein the distance is a first distance corresponding to a distance that the detected ground obstacle is behind the installation aircraft, and wherein the plan view further presents second text indicating a second distance corresponding to a distance of the detected ground obstacle to a side of the installation aircraft.

15. The method of claim 13, further comprising determining a height of the ground obstacle, wherein the plan view further comprises text indicating the height of the detected ground obstacle.

16. The system of claim 1, wherein the processing system is further configured to determine a height of the ground obstacle, and wherein the plan view further comprises text indicating the height of the detected ground obstacle.

17. The method of claim 13, wherein an extent of the plan view is limited to a first predefined area behind the installation aircraft when the installation aircraft is travelling in a backwards direction, and wherein the extent of the plan view is limited to a second predefined area ahead of the installation aircraft when the installation aircraft is travelling in a forwards direction.

18. A ground obstacle collision-avoidance system comprising:
a plurality of radar sensor modules each located at a selected different location on an exterior of an installation aircraft, wherein each radar sensor module comprises:
a radar emitter configured to emit a radar signal; and
a radar detector configured to receive a radar return signal associated with reflections of the emitted radar signal that are reflected from the ground obstacle,
wherein the radar sensor module is configured to communicate radar information corresponding to the detected radar return signal;
a processing system configured to determine a first distance from the installation aircraft to a detected ground obstacle that has been detected by at least one of the plurality of radar sensor modules, the first distance being a distance that the detected ground obstacle is behind the installation aircraft, determine a second distance from the installation aircraft to the detected obstacle, the second distance being a distance of the detected ground obstacle to a side of the installation aircraft, and generate a plan view indicating at least one aircraft icon, a graphical ground obstacle icon that is associated with the detected ground obstacle, first text indicating the first distance, and second text indicating the second distance; and
a display configured to present the plan view,
wherein a presentation location of the aircraft icon on the plan view provides a relative reference point for the installation aircraft, and
wherein a presentation location of the graphical ground obstacle icon relative to the at least one aircraft icon indicates a location of the detected ground obstacle relative to the installation aircraft.

19. The system of claim 1, wherein the type of the detected ground obstacle comprises at least one of an aircraft, a tow tug, or a person.

20. The method of claim 13, wherein the type of the detected ground obstacle comprises at least one of an aircraft, a tow tug, or a person.

* * * * *